United States Patent [19]

Knoll et al.

[11] Patent Number: 4,532,456

[45] Date of Patent: Jul. 30, 1985

[54] OUTPUT CIRCUIT FOR AN ELECTRONIC BALLAST SYSTEM

[75] Inventors: William C. Knoll, Turbotville, Pa.; David L. Bay, Beverly, Mass.

[73] Assignee: GTE Products Corporation, Stamford, Conn.

[21] Appl. No.: 646,479

[22] Filed: Aug. 31, 1984

Related U.S. Application Data

[63] Continuation of Ser. No. 397,265, Jul. 12, 1982, abandoned.

[51] Int. Cl.³ .............................................. H05B 37/02
[52] U.S. Cl. ..................................... 315/223; 315/221; 315/222; 315/244; 315/DIG. 7
[58] Field of Search ................. 315/219, DIG. 7, 224, 315/244, 220, 221, 222, 223

[56] References Cited

U.S. PATENT DOCUMENTS

| | | | |
|---|---|---|---|
| 2,291,355 | 7/1942 | Simmon | 315/99 |
| 3,080,503 | 3/1963 | Brooks | 315/187 |
| 3,753,071 | 8/1973 | Engel et al. | 363/42 |
| 3,778,677 | 12/1973 | Kriege | 315/219 |
| 4,109,307 | 8/1978 | Knoll | 315/220 |
| 4,188,661 | 2/1980 | Bower | 315/220 |
| 4,259,614 | 3/1981 | Kohler | 315/219 |
| 4,353,010 | 10/1982 | Knoll | 315/105 |

Primary Examiner—Harold Dixon
Attorney, Agent, or Firm—John A. Odozynski; William H. McNeill

[57] ABSTRACT

The above and other objects, advantages and capabilities are achieved in one aspect of the invention by an output circuit for an electronic ballast system. The circuit includes N sets of output connections for accepting N lamps. The lamps are driven by an output autotransformer coupled to the lamps through a feedback winding that is used to apply a feedback signal to an inverter drive circuit. Capacitive impedances are coupled across the lamps so that the capacitances, the lamp filaments, the feedback winding, and the output transformer form a circuit loop. The capacitances are chosen to have an impedance, at the inverter operating frequency, less than the pre-ignition impedance of the lamps and greater than the post-ignition impedance.

3 Claims, 1 Drawing Figure

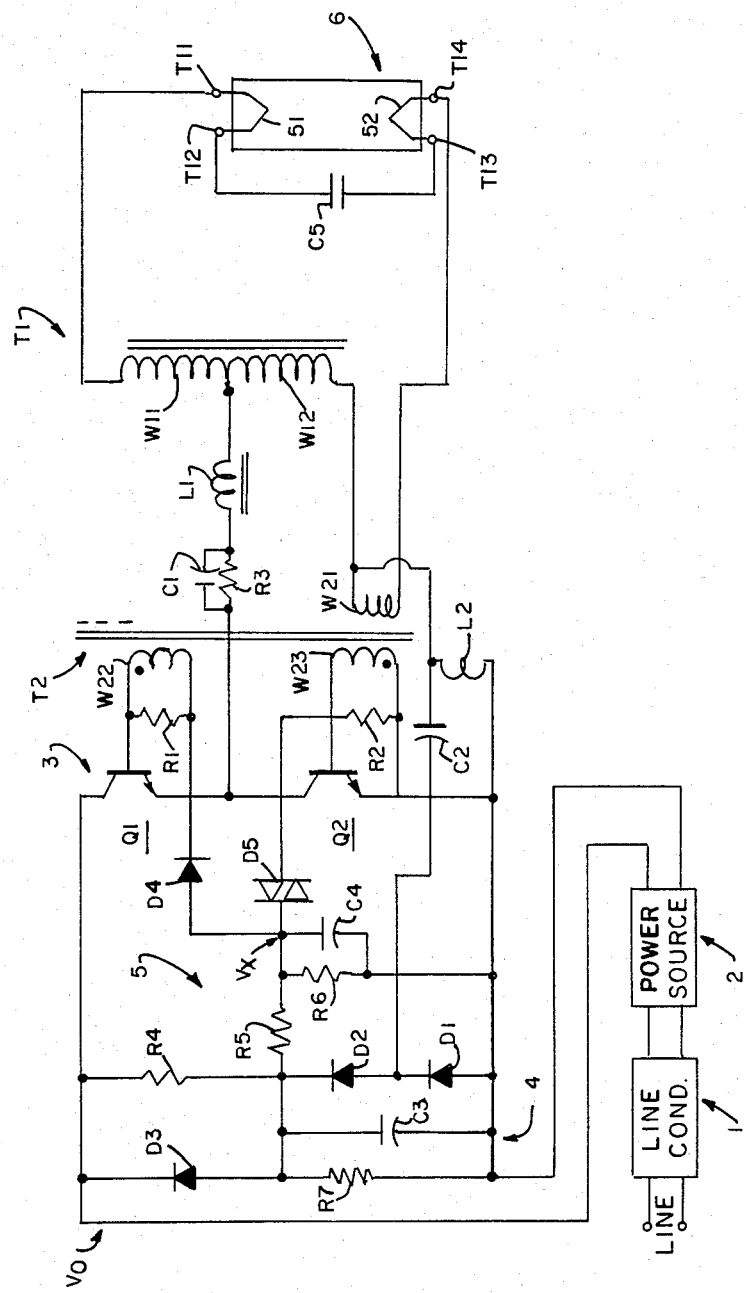

OUTPUT CIRCUIT FOR AN ELECTRONIC BALLAST SYSTEM

This application is a continuation of application Ser. No. 397,265, filed 7/12/82, now abandoned.

TECHNICAL FIELD

This invention relates to electronic ballast circuitry and more particularly to a drive circuit that preheats pairs of lamp filaments prior to lamp ignition and diverts power from those filaments subsequent to ignition.

BACKGROUND ART

United States Pat. No. 4,188,661, "Direct Drive Ballast With Starting Circuit", by Bruce L. Bower and Raymond H. Kohler, issued Feb. 12, 1980, assigned to the assignee of the present invention, and hereby incorporated by reference, describes an electronic ballast circuit for driving a pair of fluorescent lamps. Central to the operation of that invention is a high frequency (20 to 30 KHz) inverter comprising a pair of transistors connected in series and operating in a push-pull mode. The inverter drives, via an output transformer, the cathode filaments of the lamps. The output transformer comprises a series-resonant primary winding coupled to the inverter output. The secondary of the output transformer includes one lamp voltage winding and three filament windings. Two filament windings separately supply current to one filament of each of the lamps. The third filament winding supplies current to the remaining two parallel-connected filaments. Also included on the secondary of the output transformer are a series connected discrete ballasting inductor and a pair of bias windings oppositely poled and connected in series between the first and second filament windings. These windings are arranged so as to establish a voltage differential across the respective lamps sufficient to effect firing of the lamps.

The ballast circuit further includes an interstage transformer having three primary-wound feedback windings each coupled in a loop that includes at least one lamp filament and a filament winding. The secondary of the interstage transformer includes a pair of oppositely-poled windings coupled to the push-pull inputs of the inverter. Because the primary windings are coupled in a loop that includes the lamp filaments, they induce a voltage in the secondary proportional to the sum of filament currents. Proper phasing of the secondary windings provides the positive feedback necessary to sustain inverter operation. (A modified feedback arrangement disclosing a single primary winding connected in a loop with the two parallel connected filaments is disclosed in U.S. Pat. No. 4,127,893, "Tuned Oscillator Ballast Circuit With Transient Compensating Means", by Charles A. Goepel and assigned to the assignee of the present invention. See FIG. 2 of that patent.)

U.S. Pat. No. 4,188,661 also discloses circuitry for enhancing the oscillator startup operation. Upon initial energization of the ballast circuit, a capacitor connected in parallel with one of the secondaries of the interstage transformer is charged through a source of slowly developed DC voltage. When the charge across the capacitor reaches a given magnitude, a series connected diac is switched on, thereby discharging the capacitor through a relatively low impedance and animating a transient across one of the drive windings of the interstage transformer. This perturbation supplies base drive to at least one of the drive windings of the interstage transformer. This perturbation supplies base drive to at least one of the inverter transistors and assures oscillator startup. A voltage derived from the current in the primary of the output transformer is applied to the diac in a manner that renders the diac nonconducting during steady state operation of the ballast circuit.

While it cannot be gain said that the circuitry disclosed in the patent discussed above represents a substantial advance in the state of the art of ballast design, with regard to both the conventional electromagnetic and the electronic types, the subject invention represents a further substantial advance in that art. In particular the drive circuit configuration disclosed herein provides, inter alia, improved power efficiency and reliable shutdown of one ballast system as desired subsequent to ignition.

DISCLOSURE OF THE INVENTION

The above and other objects, advantages and capabilities are achieved in one aspect of the invention by an output circuit for an electronic ballast system. The circuit includes N sets of output connections for accepting N lamps. The lamps are driven by an output autotransformer coupled to the lamps through a feedback winding that is used to apply a feedback signal to an inverter drive circuit. Capacitive impedances are coupled across the lamps so that the capacitances, the lamp filaments, the feedback winding, and the output transformer form a circuit loop. The capacitances are chosen to have an impedance, at the inverter operating frequency, less than the pre-ignition impedance of the lamps and greater than the post-ignition impedance.

BRIEF DESCRIPTION OF THE DRAWING

The sole drawing is a schematic diagram of an electronic ballast system employing the subject invention.

DESCRIPTION OF A PREFERRED EMBODIMENT

For a better understanding of the present invention, together with the objects, advantages and capabilities thereof, refer to the following disclosure and appended claims in conjunction with the accompanying drawing.

Referring now to the drawing, the electronic ballast circuit derives its primary power from the AC line through a line conditioner 1. The line conditioner may include, inter alia, a transient suppressor, overload switch and line filter. (See, e.g. U.S. Pat. No. 4,188,661, supra, at column 2, lines 38–48, column 3, lines 36–52, and as illustrated in the drawing as element 5.) The output of the line conditioner is coupled to the input of a power source 2 in the form of a voltage supply which provides a nominal output voltage $V_o$, of 300 volts.

The core of the electronic ballast system illustrated in the drawing is the high frequency, series push-pull inverter 3 comprising NPN transistors Q1 and Q2. Q1 has a collector connected to the high side of the voltage supply and an emitter connected to the collector of Q2; the emitter of Q2 is in turn connected to the common or ground return of the voltage supply. The base-to-emitter junctions of both Q1 and Q2 are individually coupled by damping resistors, R1 and R2, respectively. The output of inverter 3, that is, the signal at the junction of Q1 emitter and Q2 collector, is coupled through a parallel RC network including a resistor R3 and a capacitor C1 and through an inductance, L1, to a center tapped output transformer T1, comprising a primary winding W11 and a secondary winding W12. A detailed discussion of the construction and operation of T1 is presented below. In a preferred embodiment the center tapped end of W11 is coupled to the inverter output through L1 and the parallel RC network, while the other end is coupled to the input of what, for present purposes, will be considered a secondary voltage source 4.

The feedback necessary to sustain inverter operation is provided by an interstage transformer T2. The interstage transformer includes a primary winding, W21, having one end coupled to W12 and another end adapted to be coupled to a lamp filament. Also included are opposite-poled secondary windings W22 and W23. As is apparent from the drawing, W21 completes a circuit loop that also includes T1 and filaments 51 and 52. Because of this arrangement the current that flows through those filaments must necessarily flow through W21 as well. The resulting signal developed in W21 is coupled to secondary windings W22 and W23 and is therefore fed back to the inverter input across the base-to-emitter junctions of Q1 and Q2 respectively. (Notice that W22 is coupled across the base-to-emitter junction of Q1 and W23 similarly coupled across Q2.) The phase opposition of the signals applied to Q1 and Q2, brought about by the relative (opposite) polarities of W22 and W23, as indicated on the drawing, assures oscillatory operation of the inverter.

Voltage source 4 includes an inductance L2 connected between one end of W11 and the common return. The junction of W11 and L2 is coupled through capacitor C2 to a voltage-doubling peak rectifier that includes diodes D1 and D2, charge storage capacitor C3, and resistor R4. D1 has a cathode connected to C3 and an anode connected to the cathode of D2. The other side of C3 as well as the anode of D1 is connected to the common return. R7 is connected in parallel with C3. The output of the secondary voltage source 4 is coupled through a diode D3, in the anode-to-cathode direction, to the high side of the primary voltage source 2.

Operation of voltage supply 4 is dependent on the operation of the inverter circuit in the following manner. When operating, the inverter develops approximately a 20 KHz square wave at the junction of Q1 and Q2. (The frequency of the output signal is largely determined by the resonant frequency of C1 and W11, the effect of L1 being substantially negligible.) The current flowing in W11 is coupled to the common return through L2, thereby developing a periodic voltage across L2 in proportion to that current. That voltage is coupled through C2 to rectifying diodes D1 and D2 and is applied to charge storage capacitor C3. In standard fashion the charge stored in C3 will represent a voltage substantially equal to the peak-to-peak voltage across L2, less losses attributable to the rectification process. Normally the voltage developed by the secondary voltage source 4 will be less than that developed by the primary source 2 so that D3 will be reversed biased, the two sources isolated from each other, and negligible current drawn from the secondary source. However, under low-line or other aberrant conditions, the voltage at the output of voltage supply 2 may drop so significantly that D3 will become forward biased and the secondary source will then be available and called upon to power the inverter circuitry.

Startup of the oscillator is assured by a startup circuit 5 that includes a charging resistor R4, voltage divider resistors R5 and R6, a clamping circuit, including clamping diode D4 and clamping capacitor C4, and a semiconductor switch in the form of diac D5.

R4 is coupled from the high side of $V_o$ to one side of C3 so that, subsequent to the energization of the ballast circuit, C3 begins to charge toward the voltage at the output of that source. (To be precise, it will take some time for output of $V_o$ to attain its nominal value but the duration of this delay can be expected to be de minimis in comparison with the R4C3 time constant.) R5 and R6 are series connected across C3, so that the voltage developed at the junction of R5 and R6, ultimately coupled to D5, will track the exponentially-rising voltage across C3. As illustrated in the drawing D5 has one end coupled to the output of the voltage divider, at the junction of R5 and R6, and another end coupled to an input of the inverter, at the base of Q2. Neglecting the effect of R3, the voltage, $V_x$, at the output of the voltage divider will increase roughly as $$\frac{R6}{R5 + R6} V_o (1 - e - t/R4\ C3).$$

At some time determined by the values of the components represented in that relationship above, $V_x$ will exceed the breakover voltage of D5. D5 will fire, thereby supplying bias current to the base of Q2 and initiating operation of the inverter, after which the inverter will become self-sustaining. The salient advantage of this startup circuit is that startup of the inverter is inhibited until C3 of the secondary voltage source has become charged. As a result the inverter transistors are spared some deleterious effects attendent the initial current surge required to charge C3.

The startup circuit also includes a clamping circuit comprising D4, with a cathode connected to the inverter output and an anode connected to the voltage divider output, and C4, connected from there to ground. The clamping action of D4 and C4 prevents the inverter square wave output from randomly firing D5. In effect, the clamping circuit disables the starting circuit during steady state inverter operation so that Q1 and Q2 are free from transients that might result from the random firing of D5.

As illustrated in the drawing, the output of the inverter is coupled to the center tap of T1 which in turn drives a fluorescent lamp L appropriately coupled to associated sets of terminals (T11, T12, T13, T14). Filament current and voltage are supplied by the output transformer T1. T1 is adapted to be coupled at one end to terminal T11. The other end of T2 is coupled to a first end of the primary winding W21 of the interstage transformer T2. The other end of W21 is adapted to be coupled to terminal T14.

In order to assure preheating of the lamp filaments prior to ignition and greatly lessen filament heating subsequent to ignition, the ballast circuit includes a capacitive impedance element, that is, capacitor C5 coupled between terminals as shown. To wit: C5 is coupled between T12 and T13.

As is well known, the effective impedance presented by a fluorescent lamp is much greater prior to than subsequent ignition. The capacitive impedance elements are chosen so that their effective impedances at the ballast operating frequency are less than the associated lamp impedance prior to ignition and substantially greater than the lamp impedance subsequent to ignition. (Lamp ignition occurs upon sufficient preheating of the lamps and the appearance of adequate voltage across the lamp filaments.)

Assuming a lamp presents an approximately infinite impedance prior to its ignition, (e.g., at least an order of magnitude greater than the impedances of the associated capacitive impedance elements at 25 KHz) then any output current flowing through T1 will flow identically in series with the effectively series-connected filaments and capacitance, C5. Thus the filaments will be preheated before ignition occurs. Upon sufficient preheating of the filaments the lamps will ignite, ignition being accompanied by a substantial drop in the impedance of the lamp and a diversion of T1 output current from the lamp filaments and connecting capacitances to the lamps themselves. In this manner the current flowing through the filaments will drop drastically with an attendent reduction in the amount of heat dissipated by those filaments. Because filament heating contributes nought to the light output of the lamp, the scheme described above will greatly lessen the power dissipate by the lamp load while concomitantly enhancing the efficiency of the ballast system.

In addition to offering improved efficiency, the ballast system described above represents a significant reduction in the number of components, particularly magnetic components, heretofore required in the output section of known ballast circuits. Furthermore, because the feedback signal developed in W21 is related to the lamp filament current and because the lamp filaments are series-connected via the capacitive impedance, removal of a lamp or of any lamp filament will necessarily result in shutdown of the ballast system, a virtual requirement given the abnormal loading conditions generally experienced under laboratory testing conditions.

Finally, although the subject invention is particularized to include capacitors connected in series with lamp filament string, it is clear that other impedance elements may be substituted in that position. What is required is that the elements exhibit an impedance substantially less than that of the lamp prior to ignition and an impedance substantially greater than that of the lamp subsequent to ignition. This of course contemplates not only fixed impedance elements but also circuit elements, the impedances of which vary or are made to vary according to lamp ignition. For example, a three terminal (semiconductor) device, triggered by lamp ignition, may be inserted in place of the capacitive element without departing from the inventive concept disclosed herein.

Accordingly, while there has been shown and described what at present is considered to be the preferred embodiment of an improved output configuration for an electronic ballast circuit, it will be obvious to those skilled in the art that various changes and modifications may be made therein without departing from the invention as defined by the appended claims.

INDUSTRIAL APPLICABILITY

This invention is useful in electronic ballast systems for fluorescent or other types of lamps.

What is claimed is:

1. An electronic ballast circuit having a high frequency push-pull inverter and an output circuit, said inverter providing an oscillatory drive signal to said output circuit and said output circuit including an interstage transformer with series-connected primary and secondary windings and a center tap coupled by a series-connected inductor and parallel-connected resistor and capacitor to said inverter, a feedback network having a winding in series connection with said primary and secondary windings of said interstage transformer and coupled to said inverter, a set of first, second, third and fourth terminals formed for connection to a discharge lamp with said first and fourth terminals coupled to said primary winding of said interstage transformer and said winding of said feedback network respectively, and an impedance element coupled to said second and third terminals to provide an impedance shunting said discharge lamp.

2. The electronic ballast circuit of claim 1 wherein said impedance element is in the form of a capacitor.

3. The electronic ballast circuit of claim 1 wherein said impedance element provides an impedance less than the impedance presented by an associated discharge lamp prior to lamp ignition and greater than the impedance presented by said discharge lamp subsequent to lamp ignition.

* * * * *